(12) United States Patent
Chihara

(10) Patent No.: US 6,497,359 B1
(45) Date of Patent: Dec. 24, 2002

(54) CIRCULATION MANAGEMENT SYSTEM FOR ISSUING A CIRCULATION MEDIUM

(75) Inventor: Mitsuo Chihara, Tokyo (JP)

(73) Assignee: Ever Prospect International Limited, Hong Kong (HK)

( * ) Notice: Subject to any disclaimer, the term of this patent is extended or adjusted under 35 U.S.C. 154(b) by 0 days.

(21) Appl. No.: 09/530,656

(22) PCT Filed: Nov. 4, 1997

(86) PCT No.: PCT/JP97/04016

§ 371 (c)(1),
(2), (4) Date: May 3, 2000

(87) PCT Pub. No.: WO99/23622

PCT Pub. Date: May 14, 1999

(51) Int. Cl.$^7$ ................................. G06K 5/00
(52) U.S. Cl. ....................... 235/380; 235/379; 235/385
(58) Field of Search ................ 235/375, 379, 235/380, 381, 382, 383, 449, 492, 493, 494; 705/34, 35, 39, 43, 44

(56) References Cited

U.S. PATENT DOCUMENTS

| | | | | |
|---|---|---|---|---|
| 3,956,615 A | * | 5/1976 | Thomas et al. | |
| 4,385,285 A | * | 5/1983 | Horst et al. | 235/379 |
| 4,630,201 A | * | 12/1986 | White | 235/379 |
| 5,083,782 A | * | 1/1992 | Nelssen | 273/138 R |
| 5,826,241 A | * | 10/1998 | Stein et al. | 705/26 |
| 5,913,202 A | * | 6/1999 | Motoyama | 705/35 |
| 6,003,763 A | * | 12/1999 | Gallagher et al. | 235/379 |

FOREIGN PATENT DOCUMENTS

| | | |
|---|---|---|
| JP | 2018098 | 1/1990 |
| JP | 3-86564 | 4/1991 |
| JP | 4-225468 | 8/1992 |
| JP | 6-35946 | 2/1994 |
| JP | 6-505582 | 6/1994 |

* cited by examiner

Primary Examiner—Thien M. Le
Assistant Examiner—Daniel St. Cyr
(74) Attorney, Agent, or Firm—Armstrong, Westerman & Hattori, LLP (57) ABSTRACT

A circulation management system according to the present invention comprises a host computer of a bank, circulation medium issuing means incorporated in automatic teller machines of the bank, and terminals installed in each store, so that a user can purchase commodities or receive services at stores which are tied up with a bank using the circulation medium issued by the bank which has a function equivalent to a predetermined amount of money. The circulation medium issuing means and the terminals are connected to the host computer through lines, and when a circulation medium is issued, the circulation medium issuing means issues the circulation medium for the requested amount with assigning identification codes to the circulation medium within the limit of the balance of deposits of the user. The host computer withdraws an amount equivalent to the issued circulation medium from the account of the user and stores the identification code of the issued circulation medium. The store passes the circulation medium received from the user for the commodity or service through the terminal, transmits the identification code to the host computer of the bank, and has the host computer confirm whether this circulation medium is genuine. At this time, the host computer collates the transmitted identification code with the identification code stored when the circulation medium was issued, judges whether this circulation medium is genuine, and deposits the amount of money of the circulation medium into the account of the store if genuine.

7 Claims, 7 Drawing Sheets

CIRCULATION MEDIUM ISSUE

TYPE OF
CIRCULATION MEDIUM        NUMBER OF SHEETS

10000 YEN · · · · · ·    [  ]

5000 YEN · · · · · ·    [  ]

1000 YEN · · · · · ·    [  ]

[0][1][2][3][4][5][6][7][8][9]

[PREVIOUS SCREEN]  [CANCEL]  [CONFIRM]

Fig. 10

CIRCULATION MANAGEMENT SYSTEM
FOR ISSUING A CIRCULATION MEDIUM

TECHNICAL FIELD

The present invention relates to a circulation management system by which consumers can purchase commodities or receive services using circulation medium which has a function equivalent to a certain amount of money by adding an identification code.

BACKGROUND ART

Recently an automated teller machine (hereafter ATM) which mechanically executes withdrawals, deposits and money transfers at a bank to make these operations efficient is widely used.

To install such an ATM, a storage means for storing the account number, balance of deposits and the code number of the user is disposed in the host computer of the bank, a card reader for reading the account number stored on the cash card is disposed in the ATM, and the ATM and the host computer are connected through lines. If the user inserts a cash card into the card reader of the ATM to make a withdrawal, for example, the ATM transmits the account number read from the cash card to the host computer of the bank, and prompts the user to input the code number via a keypad. Then it is judged whether the code number which was input via the keypad and the code number associated with the account number stored in the storage means of the host computer are the same, and if they are the same, the user is regarded as genuine and the input for the amount of the withdrawal is prompted, and if the amount input via the keypad is within the balance of deposits, cash for the input amount is paid out.

As an additional function of the ATM, Japanese Patent Laid-Open No. 8-263726 states of disposing means for issuing various tickets, such as airline tickets, reserved seat tickets of a railroad, boarding tickets and movie/concert tickets from an ATM, so as to purchase such tickets on the spot.

In the above stated ATM which has a cash payment function, however, a predetermined amount of cash must always be stocked in the ATM, and particularly when cash cannot be replenished due to a holiday when teller windows are closed, a large amount of cash is stocked on the day before. So, recently many crimes involving destruction of an ATM the night before a holiday where stocked cash is stolen are frequently occurring. Also, even on a day other than a holiday, cash must be replenished each time cash in the ATM becomes low, and this operation is complicated. Also, cash stocked in an ATM sits idle and cannot be used effectively.

Also, with the current circulation system based on cash, a large amount of cash, such as proceeds, must be managed by the store, which is not good for crime prevention, and the user is not insured when money is lost.

So recently, circulation systems based on credit transactions using credit cards is becoming popular, and circulation systems using electronic money are also being constructed, but for both cases, safety problems related to illegal use have not yet been solved.

Therefore, it is an object of the present invention to provide a circulation system which is useful for three parties: a bank, a user and a store, improving safety against illegal use.

DISCLOSURE OF THE INVENTION

An embodiment of the present invention is circulation management system that has a host computer of a bank for managing the balance of deposits for each account, circulation medium issuing means connected to the host computer through communication lines for issuing a circulation medium having a function equivalent to a predetermined amount of money by assigning an identification code within the limit of the balance of deposits of a user, and a terminal installed at a store coupled with the bank, which has a function to read an identification code assigned to the circulation medium, the terminal is connected to the host computer through communication lines, and has a transmission function to transmit the read identification code of the circulation medium to the host computer, characterized in that the host computer additionally has identification code storage means for storing the assigned identification code of the circulation medium, withdrawal means for withdrawing an amount of money equivalent to the issued circulation medium from the account of the user, judgment means for collating the identification code transmitted from the terminal and the identification code stored in the identification code storage means and judging whether the circulation medium with the identification code is genuine, money transfer means for transferring an amount of money equivalent to the circulation medium to the account of an origination store when the circulation medium is genuine, and used code management means for managing the identification codes of the used circulation medium.

To issue the circulation medium, which functions just like money, in this circulation management system, the issuance of the circulation medium is directed by controlling the circulation medium issuing means of the bank. At this time, the host computer of the bank issues the circulation medium for the requested amount by adding the identification code within the limit of the balance of deposits of the user, withdraws the amount according to the issued circulation medium from the account of the user, and stores the identification code of the issued circulation medium in the identification code storage means.

To use the circulation medium at a store which is coupled with the bank, the user purchases a desired commodity by giving this circulation medium to the clerk just like cash. At this time, the clerk transmits the identification code to the host computer of the bank by passing the circulation medium through the terminal installed at the store, so as to confirm that the received circulation medium is genuine. When the host computer of the bank receives the identification code from the store in this way, the judgment means of the host computer collates the received identification code and the identification code stored in the identification code storage means of the host computer, and judges whether the circulation medium is genuine. If the circulation medium is genuine, the amount equivalent to the circulation medium is transferred to the account of the transmission origination store by the money transfer means of the host computer, and the identification code of the circulation medium is managed and the genuineness of the circulation medium is verified for the store by the used code management means.

In this way, the bank can merely stock the circulation medium, which is only a piece of paper without the identification code, and does not have to stock cash in the circulation medium issuing means, which is desirable in terms of crime prevention. Also, cash is not paid from the circulation medium issuing means, so compared with the case where a large amount of cash stocked, like the case of a cash automatic teller machine, cash can be managed more efficiently. The identification code of a used circulation medium is managed by the used code management means, so a used circulation medium cannot be illegally used, and even if the identification code is altered, the circulation medium cannot be used unless its identification code matches the identification code stored in the identification code storage means. Therefore, safety against illegal use is insured.

Even if a user loses the circulation medium, the user can notify the identification code of the circulation medium, which the user wrote down, to the bank so as to prevent the use of the circulation medium or to have the bank insure an amount equivalent to the circulation medium. Also, by registering the identification code of the circulation medium in the host computer, a criminal who uses the circulation medium illegally at a store can be apprehended.

For a store, the circulation medium is passed through the terminal and an amount equivalent to the circulation medium is immediately paid into the account of the store if the circulation medium is genuine. There is no need to store cash, such as proceeds, in the store, which is desirable in terms of crime prevention. Even if an illegal circulation medium circulates, the host computer of the bank manages the circulation medium, so the store is free from liability.

Such a circulation medium, which can be created with such inexpensive material as paper, can be used only once without being used repeatedly like a credit card and electronic money, so, potential illegal use can be decreased and safety against illegal use can be improved. Since the circulation medium is issued on the basis of the deposits of the user, and is not issued in excess of the balance of deposits, voluntary bankruptcy due to unreasonable loans can clearly be prevented.

Additionally, the used code management means may delete the identification code of the used circulation medium from the identification code storage means, or move the used identification code to a storage area other than the identification code storage means or mark the used identification code within the identification code storage means. A possible illegal use of a circulation medium is to alter the used circulation medium for reuse. Deleting the used identification code by the used code management means is preferable in terms of using the memory of the host computer effectively. However, the history of the altered circulation medium cannot be known, so it is preferable to move the used identification code to another storage area or to mark the used identification code. To use memory more efficiently, the used identification code may be deleted after a predetermined period of time elapses.

Further, it is preferable that a printed matter, identical to the circulation medium without the identification code, is used as a circulation medium to be stored in the circulation medium issuing means. It is possible to print all the printed parts of the circulation medium within the circulation medium issuing means by a color printer built into the circulation medium issuing means, but with this configuration, issuing a circulation medium takes time and the unit price of the circulation medium becomes high, so it is preferable to use a printed matter where parts other than the identification code printing part have been printed in advance.

Additionally, a plurality of types of circulation media with different face values, similar to paper currency, may be used. In the case of Japanese currency, for example, it is preferable to use a plurality of types of circulation medium, corresponding to common bills, such as 1000 Yen, 5000 Yen and 10000 Yen.

Further, it is preferable that the circulation medium issuing means is incorporated into the automatic teller machines of the bank. Since an automatic teller machine has a cash card reader, code number input means and display means, the circulation medium issuing means can be created inexpensively by sharing this equipment. Also, an increase in the number of users of the circulation medium decreases the cash to be stored in an automatic teller machine, so cash which was once stocked can be effectively used, and crime prevention can also be improved.

Still further, it is possible to dispose recording paper output means for printing or magnetically storing the identification code of the issued circulation medium in the circulation medium issuing means. In this case, when a circulation medium is lost, the identification code of the lost circulation medium can easily be checked from the recorded content of the recording paper.

Also, alarming means for alerting a clerk when the circulation medium passes through the terminal, and is judged as not genuine by the judgment means, may be disposed in the terminal. With this configuration, use of an illegal circulation medium can easily be checked, and apprehending a user who used the illegal circulation medium is also possible.

Further, collection means for collecting a used circulation medium may be disposed in the terminal. Illegal use of a used circulation medium is almost impossible since the identification code is managed by the used code management means of the host computer of the bank, but the possibility for illegal use still remains, so it is preferable to collect the used circulation medium by a collecting means so as to be disposed or managed by the bank.

BEST MODE FOR CARRYING OUT THE INVENTION

Embodiments of the present invention will now be described with reference to the accompanying drawings.

Figure 1:
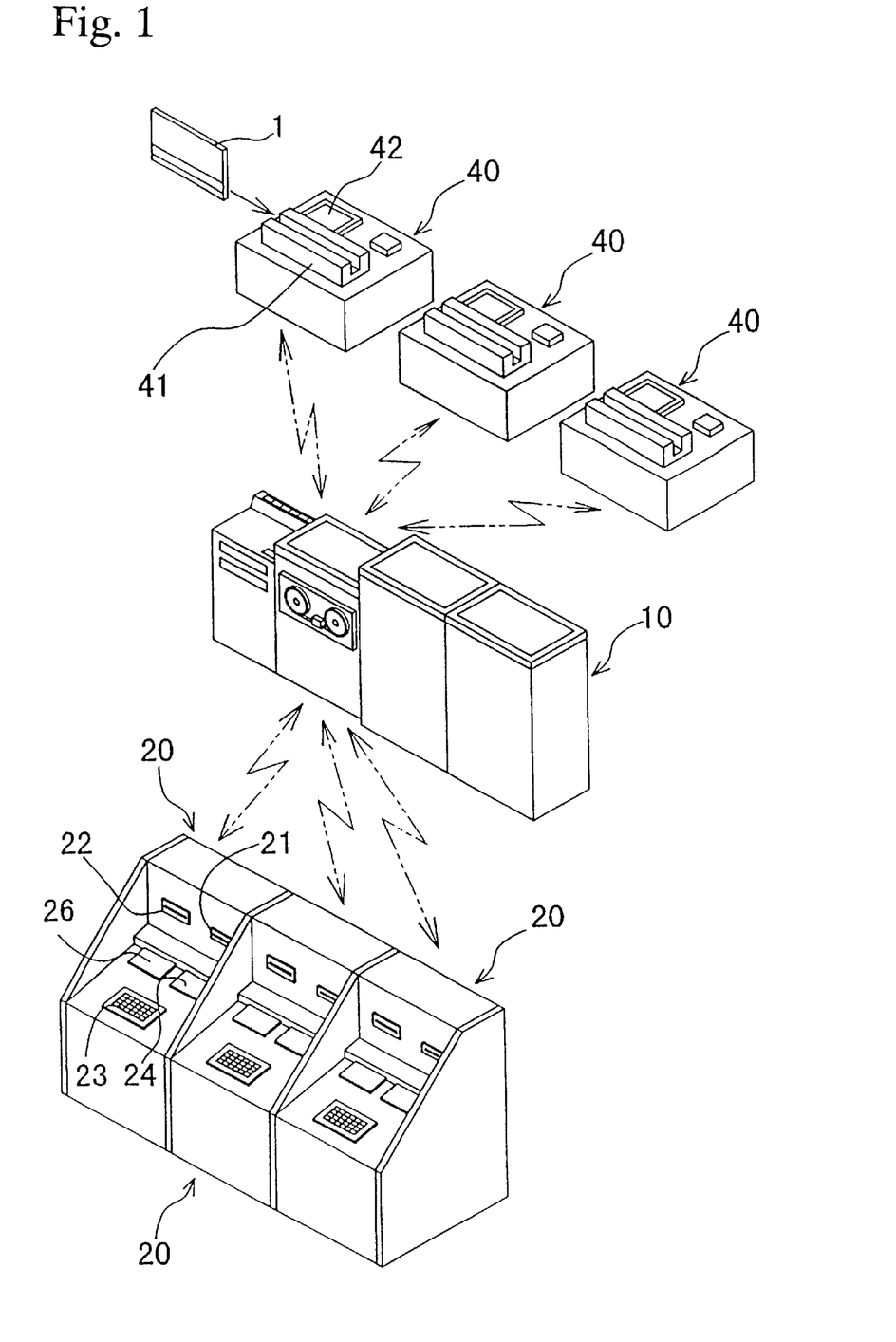
FIG. 1 is a drawing depicting a general configuration of the circulation management system.
Figure 2:
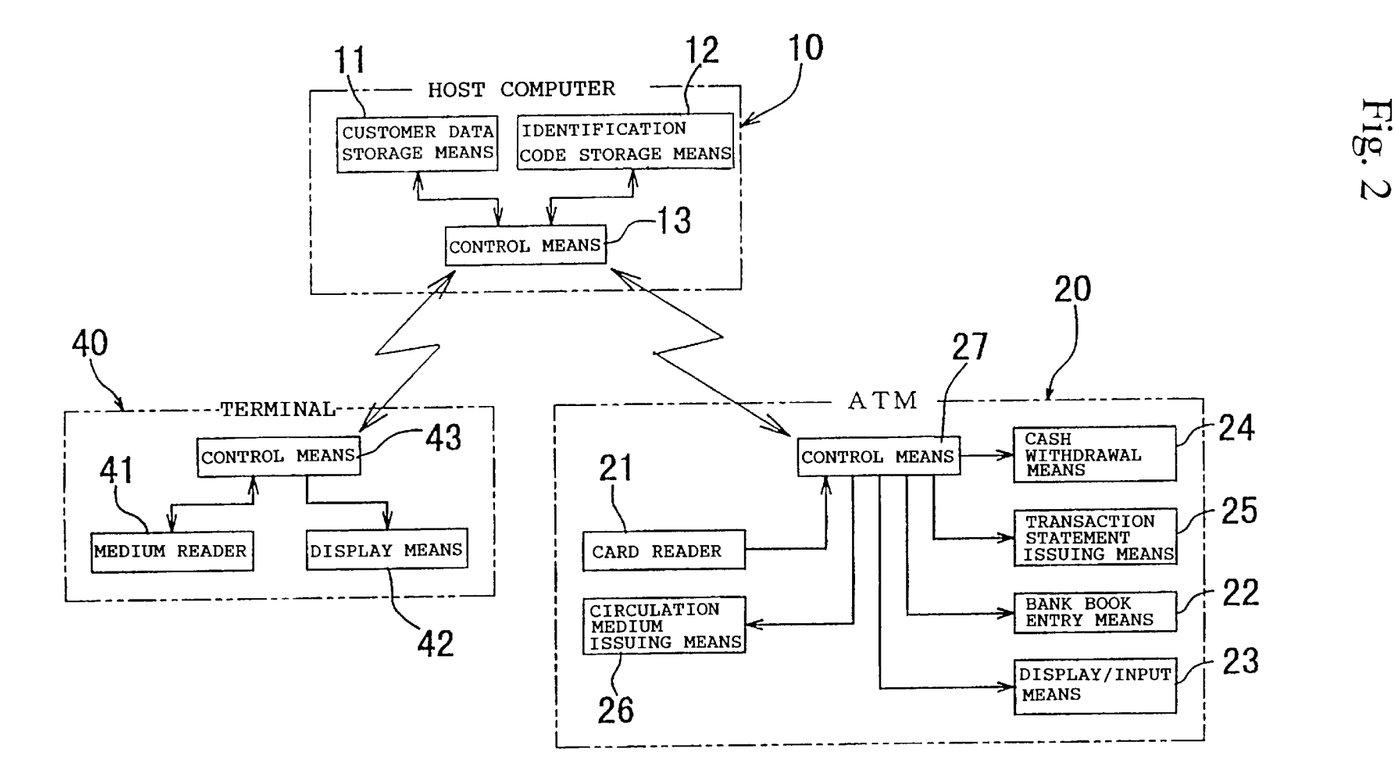
FIG. 2 is a block diagram depicting a general configuration of the circulation management system.

As FIG. 1 and FIG. 2 show, a circulation management system issues a circulation medium (see FIG. 4) 1 to a user from a bank within the limit of the balance of deposits, so that the user can purchase commodities or receive services at a store which is linked to the bank, using this circulation medium 1, and is comprised of a host computer 10 of the bank which manages the balance of deposits for each account, automatic teller machines (hereafter ATM) 20 of the bank connected to the host computer 10 through lines, and terminals 40 installed in the stores which are tied up with the bank, and are connected to the host computer 10 through lines.

The customer data storage means 11 of the host computer 10 stores such customer data as address, name, code number and balance of deposits of the user for each account number, and the identification code storage means 12 stores the amount and issue date of the issued circulation medium 1 for each identification code.

Figure 3:
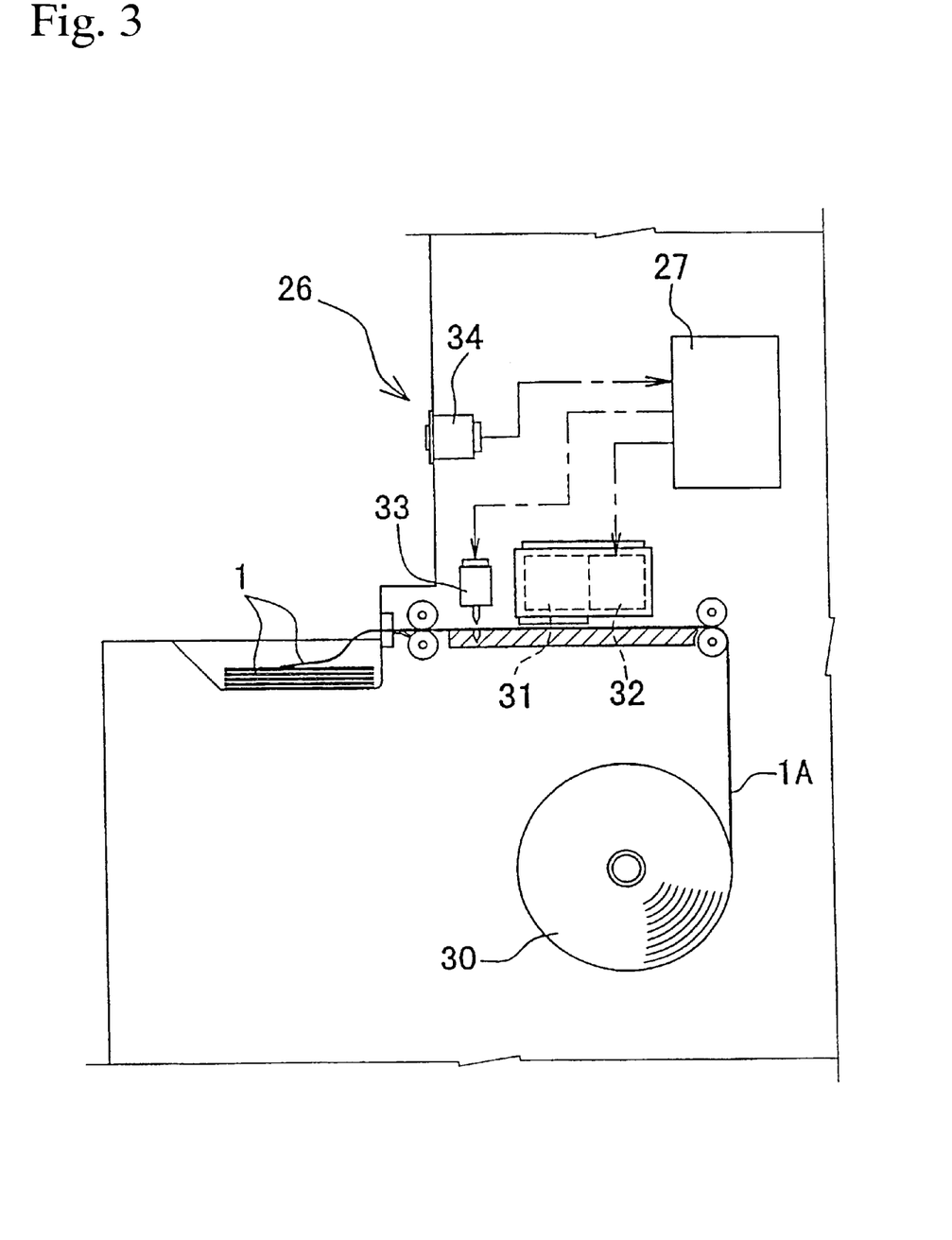
FIG. 3 is a side view of the circulation medium issuing means.

The ATM 20 is used for such normal operations as withdrawals, deposits and money transfers, and is comprised of a card reader 21 for reading the account number from a cash card, bank book entry means 22 for making entries to a bank book, touch panel type display/input means 23 which displays various guides and instructions on screen and allows various inputs by touching the screen with a finger, cash withdrawal means 24 for counting and withdrawing cash stocked in the ATM 20, transaction statement issuing means 25 for issuing a transaction statement, circulation medium issuing means 26 for issuing a circulation medium 1 which configuration is unique to the present invention, and control means 27 for controlling these means, as shown in FIG. 1–FIG. 3. The circulation medium issuing means 26, however, may be configured independently from the ATM 20.

As FIG. 3 shows, the circulation medium issuing means 26 is comprised of a roll 30 of the circulation medium 1A where printed identification code is not printed, code printing means 31 for printing an identification code on the code printing part 2 of the circulation medium 1A (see FIG. 4), writing means 32 for magnetically storing the identification code to the code storage part 3 of the circulation medium 1, cutting means 33 for cutting the circulation medium 1 at a predetermined length, and recording paper outputting means 34 for printing the identification code of the issued circulation medium 1 on a recording paper and outputting the recording paper. The recording paper output means 34 may be omitted and the identification code may be printed on the transaction statement issued by the transaction statement issuing means 25.

The roll 30 is a strip of continuous paper where the amount, bank name and other data are printed for each circulation medium 1A, and the code storage part 3, where a magnetic substance is attached, is created on each circulation medium 1A which is created by cutting the roll 30. Cut forms, which are pre-cut to the size of the circulation medium 1A, and on which the amount, bank name and other data are printed, may be stocked in the ATM 20 as the circulation medium 1A. In this case, the cutting means 33 can be omitted but automatic paper feeding means for supplying the circulation medium 1 one-by-one must be disposed.

Figure 4:
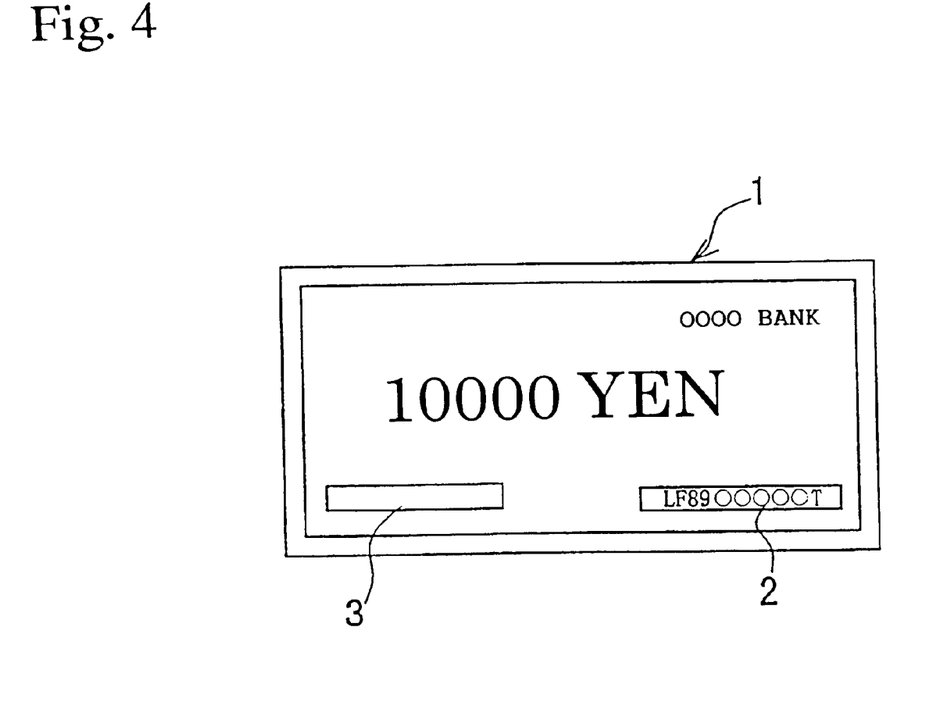
FIG. 4 is a plan view of the circulation medium after issuing.
Figure 5:
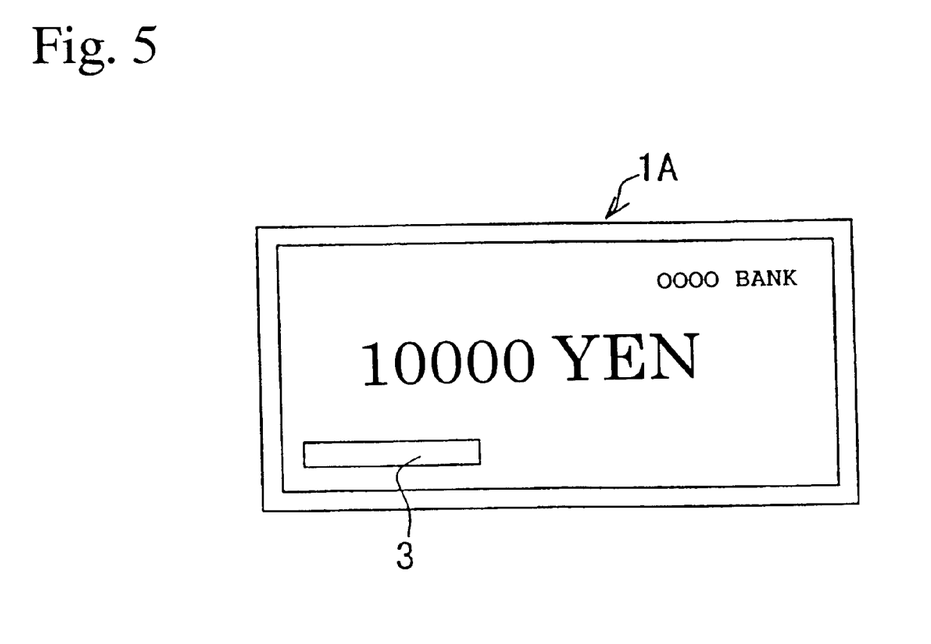
FIG. 5 is a plan view of the circulation medium before issuing.

The circulation medium issuing means 26 prints the identification code on the code printing part 2 of the circulation medium 1A based on instructions from the control means 27 as shown in FIG. 4, stores the identification code, branch name of the issued bank and other data in the code storage part 3, and issues the circulation medium 1 by cutting the paper at a predetermined length.

For the circulation medium 1, preparing a plurality of types with a different design depending on the face value is preferable, just like currency. In the case of Japanese currency, for example, three types of circulation medium are issued corresponding to the three types of paper currency: 1000 Yen, 5000 Yen and 10000 Yen. In this configuration, however, a plurality of sets of the code printing means 31, writing means 32 and cutting means 33 are necessary, so the code printing means 31 may print the face value on the circulation medium 1 as well and the plurality of types of circulation medium 1 with different face value may be issued using the same design of circulation medium 1.

The terminal 40 installed at each store is comprised of a medium reader 41 for reading the identification code of the circulation medium 1, display means 42 for displaying the read identification code and displaying information sent from the host computer 10, and the control means 43 for controlling these means as shown in FIG. 1 and FIG. 2. To prevent an illegal action with a used circulation medium 1, a collection means for collecting the circulation medium read by the medium reader 41 may be disposed in the terminal 40 so that the bank manages the collection means.

Figure 6:
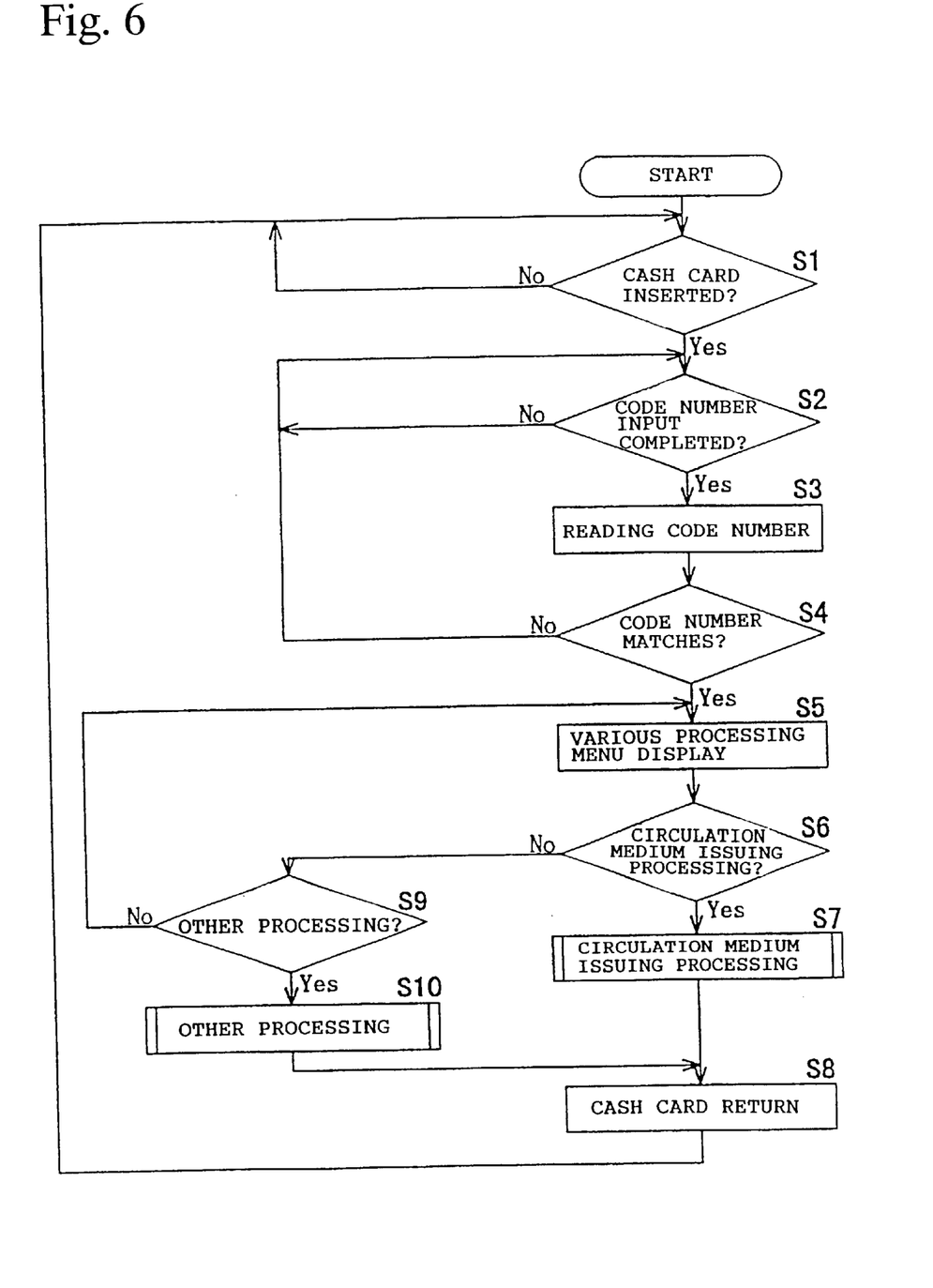
FIG. 6 is a flow chart depicting a control routine executed by an ATM.

Now, control executed by the control means 27 of the ATM 20 will be described with reference to the flow chart shown in FIG. 6. In FIG. 6, Si (i=1, 2, 3, . . . ) shows each step.

When power of the ATM 20 is turned ON, this control starts, and when a user inserts a cash card into the card reader 21 of the ATM 20 for such processing as withdrawal, deposit, money transfer, entry to a bank book, and issuing a circulation medium 1, the step shifts from S1 to S2, and the ATM 20 stands by until the user inputs the code number prompted by the display screen.

Figure 7:
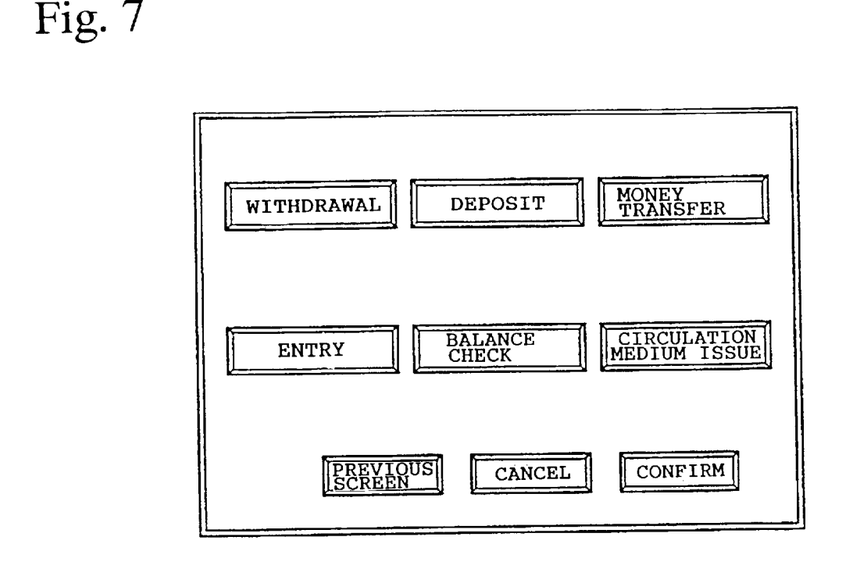
FIG. 7 is a drawing depicting a display screen of various processing menus of an ATM.

When the code number is input, the code number is read from the customer data storage means 11 of the host computer 10 based on the account number of the cash card read by the card reader 21 (S3), and it is judged whether the code number read by the card reader 21 and the code number read from the customer data storage means 11 match (S4). If they match, the step moves to S5 regarding the user as genuine, but if there is no match, the step returns to S2 and a re-input of the code number is instructed since a code number typing error may have occurred. If the code numbers do not match for a plurality of times, it is possible that the user is illegally using the cash card, so an alarm may alert the clerk. When the code numbers match and the user is judged as genuine, a selection menu for various processing, such as "withdrawal", "deposit", "money transfer", "entry", "balance check" or "circulation medium issue" is displayed (S5) as shown in FIG. 7. To execute "circulation medium issue" in the display/input means 23 of the ATM 20, for example, the "circulation medium issue" part of the display screen is selected by touching with a finger, then the "confirm" part is touched by a finger.

By selecting "circulation medium issue" in this way, the step moves to the circulation medium issue processing routine and such processing as issuing a circulation medium 1 is executed (S7), then the cash card is returned to the user (S8). If a processing other than circulation medium issuing is selected, the step moves from S6 to S9 and to S10, then after executing the selected processing, the step moves to S8.

Figure 8:
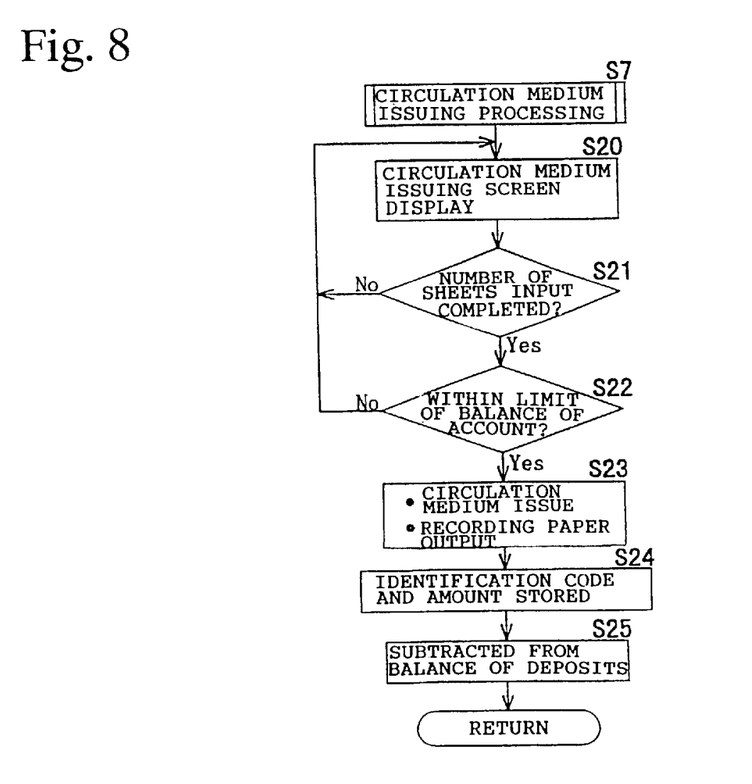
FIG. 8 is a flow chart depicting a circulation medium issuing control routine.

Now, the circulation medium issuing processing routine will be described with reference to the flow chart in FIG. 8.

Figure 9:
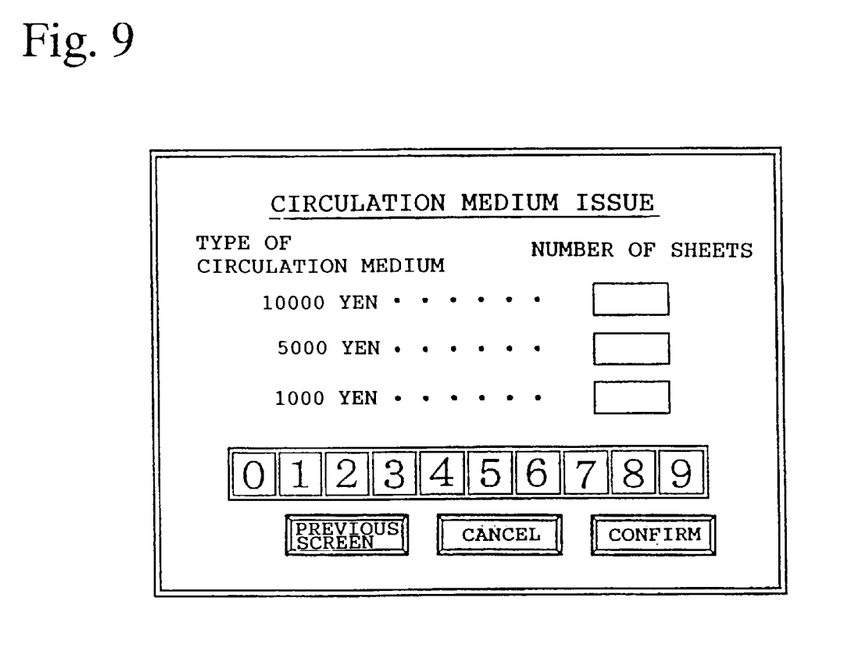
FIG. 9 is a drawing depicting a circulation medium input screen of an ATM.

At first, the screen for issuing the circulation medium shown in FIG. 9 is displayed on the display/input means 23 (S20).

Then it is judged whether input of the number of the circulation medium 1 has completed (S21). An example of the input method is where the number of a 10000 Yen circulation medium is input by touching the numeric keys at the bottom of the screen with a finger, then "confirm" below the numeric keys is touched by a finger to complete the input of the number of 10000 Yen circulation medium 1, as shown in FIG. 9. In the same manner, the number of 5000 Yen circulation medium 1 and the number of 1000 Yen circulation medium 1 are sequentially input, and the input of the number of circulation medium 1 is completed. To correct the number of medium input, "cancel" is touched, and to return to the menu screen, "previous screen" is touched.

Then it is judged whether the total amount of the circulation medium 1, which was input, is within the balance of deposits in the account of the user (S22). If the total amount exceeds the balance, the step returns to S20 where re-input is instructed. In other words, the circulation medium 1 is issued within the limit of the balance of deposits so that access exceeding the balance of deposits is prohibited.

If the total amount is within the balance of deposits, the specified number of circulation medium 1 are issued respectively, and a recording paper, where the identification codes of the circulation medium 1 are printed or are magnetically stored, is output. At this time, the host computer 10 assigns an identification code for each circulation medium 1, prints the identification code on the code printing part 2 of the circulation medium 1 by the code printing means 31, stores the identification code to the code storage part 3 of the circulation medium 1 by the writing means 32, and issues the circulation medium 1. The processing in S25 corresponds to the debit means.

Then the host computer 10 stores the identification codes of the issued circulation medium 1 in the identification code storage means 12 of the host computer 10, along with storing the amount and issue data of the circulation medium 1 of each identification code for each identification code (S24), then subtracts the total amount of the issued circulation medium 1 from the balance of deposits of the account of the user (S25). In this way, financial value is added to the issued circulation medium 1, and using this circulation medium 1, the user purchases commodities or receives services at stores which are tied up with a bank.

Figure 10:
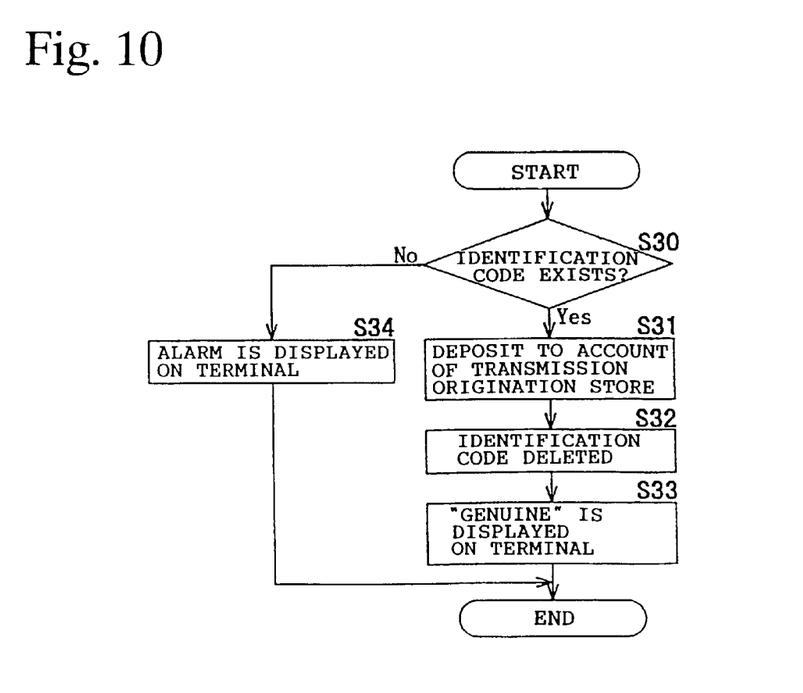
FIG. 10 is a flow chart depicting a circulation medium confirmation control routine executed by the host computer.

Now, control executed by the control means 13 of the host computer 10 when the circulation medium 1 is used will be described with reference to the flow chart shown in FIG. 10.

When a user purchases a commodity or receives services using the circulation medium 1, the store passes the received circulation medium 1 through the medium reader 41 of the terminal 40 installed at the store, and has the host computer of 10 of the bank confirm whether the circulation medium 1 is genuine. When the host computer 10 receives the identification code sent from the terminal 40 of the store in this way, this control starts and it is searched whether the identification code corresponding to the received identification code is stored in the identification code storage means 12 (S30). The processing in S30 is equivalent to the judgment means.

If the corresponding identification code exists, the amount stored along with the identification code is deposited to the account of the transmission origination store (S31), the identification code is deleted from the identification code storage means 12 (S32), and the display means 42 of the store displays that the circulation medium 1 is genuine (S33). The processing in S31 is equivalent to the money transfer means, and the processing in S32 is equivalent to the used code management means. In S32, the identification code may be marked by a code which indicates "used" in the identification code storage means 21 without deleting the identification code from the identification code storage means 12, or the identification code may be moved to a dedicated storage area other than the identification code storage means 12.

If a corresponding identification code does not exist, the circulation medium 1 may be illegal, so an alarm is generated by displaying the alarm on the display means 42 of the terminal 40 of the transmission origination store (S34). The processing in S34 is equivalent to the alarm means.

In this way, the host computer 10 confirms the identification code, so illegal use of the circulation medium 1 is effectively controlled.

If the issued circulation medium 1 is not used for a predetermined period, six months after issuance, for example, the identification code may be deleted from the identification code storage means 12 of the host computer 10 so as to control use of the circulation medium 1. In this circulation management system, an ATM can be operated with less cash being stocked, so a part of the profit may be returned to users by, for example, adding a privilege according to the amount of use of the circulation medium 1, or issuing a circulation medium 1 with a predetermined discount rate.

Industrial Applicability

According to the circulation management system in accordance of the present invention, the following effects can be received.

The bank does not have to stock cash in the circulation medium issuing means, so crime prevention improves and cash can be used efficiently. Also, since the host computer can manage the identification code of the circulation medium, illegal use of the circulation medium can be effectively prevented.

The user can stop use or have an amount equivalent to the circulation medium insured when the circulation medium is lost.

For stores, an amount of money corresponding to the circulation medium is deposited immediately into the account of the store by passing the circulation medium through the terminal. Since cash, such as proceeds, does not have to be stored in the store, crime prevention can be improved.

Such a circulation medium can be created with such inexpensive material as paper, which can be disposed of after one use, so the possibility of illegal use can be decreased and safety against illegal use can be improved.

By registering the identification code of a lost or stolen circulation medium in the host computer, a user who illegally uses the circulation medium at a store can be apprehended and safety against illegal use can be further improved.

Also according to the system of the present invention, deleting the used identification code by the used code management means is preferable to effectively use the memory of the host computer. Moving the used identification code to another storage area or marking the used identification code allows an investigation of the history of the circulation medium, which is preferable to control crimes of illegal use.

Also according to the system of the present invention, the circulation medium can be issued merely by adding an identification code to the printed matter, so circulation medium issuing processing can be executed efficiently. Such printed matter can be created less expensively than printing with a color printer.

According to the system stated in claim 4, a plurality of types of circulation media can be used corresponding to familiar paper currency, such as 1000 Yen, 5000 Yen and 10000 Yen in the case of Japanese currency.

Also according to the system of the present invention, many composing elements can be shared between an automatic teller machine and a circulation medium issuing means, which decreases the manufacturing cost of the circulation medium issuing means. As the number of users of a circulation medium increase, the cash stocked in the automatic teller machine can be decreased, therefore cash can be effectively used and crime prevention can be improved.

Also according to the system of the present invention, the identification codes of the issued circulation medium can be printed on recording paper, so the user does not have to take such procedures as writing down the identification code of an issued circulation medium.

Also according to the system of the present invention, an alarm is generated from the alarm means of the store when an illegal circulation medium is used, so the facial appearance of an individual who uses an illegal circulation medium can be confirmed, or the individual can be apprehended.

Also according to the system of the present invention, illegal use of a circulation medium can be prevented even more effectively by collecting the used circulation medium by the collection means.

What is claimed is:

1. A circulation management system Comprising: a host computer of a bank for managing balance of deposits for each account; circulation medium issuing means connected to said host computer through communication lines for issuing a circulation medium having a function equivalent to a predetermined amount of money by assigning an identification code within a limit of the balance of deposits of a user; and a terminal installed at a store coupled with the bank, which has a function to read an identification code assigned to the circulation medium, the terminal is connected to the host computer through communication lines and has a transmission function to transmit the read identification code of the circulation medium to the host computer, characterized in that said host computer further comprises identification code storage means for storing the assigned identification code of the circulation medium, withdrawal means for withdrawing an amount of money equivalent to the issued circulation medium from an amount of the user, judgment means for collating the identification code transmitted from the terminal and the identification code stored in the identification code storage means and judging whether the circulation medium with said identification code is genuine, money transfer means for transferring an amount of money equivalent to said circulation medium to an account of an origination store when the circulation medium is genuine, and code Management means for managing identification codes of used circulation medium, wherein said code management means deletes the identification code of the used circulation medium from the identification storage means, or move the used identification code to a storage area other than the identification code storage means, or marks the used identification code within the identification code storage means.

2. The circulation management system according to claim 1, characterized in that a printed matter, identical to the circulation medium without the identification code, is used as a circulation medium to be stored in said circulation medium issuing means.

3. The circulation management system according to one of claim 1, characterized in that a plurality of types of circulation medium with different face values are used as said circulation medium.

4. The circulation management system according to claim 1, characterized in that said circulation medium issuing means is incorporated into automatic teller machines of a bank.

5. The circulation management system according to claim 1, characterized in that recording paper output means for printing or magnetically storing the identification code of the issued circulation medium on recording paper is disposed in said circulation medium issuing means.

6. The circulation management system according to claim 1, characterized in that alarm means for alerting a clerk when the circulation medium passed through the terminal is judged as not genuine by the judgment means is disposed in said terminal.

7. The circulation management system according to claim 1, characterized in that collection means for collecting a used circulation medium is disposed in said terminal.

* * * * *